(12) United States Patent
Haselden et al.

(10) Patent No.: US 7,707,189 B2
(45) Date of Patent: Apr. 27, 2010

(54) LOG MANAGEMENT SYSTEM AND METHOD

(75) Inventors: J. Kirk Haselden, Sammamish, WA (US); Sergei Ivanov, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 10/958,848

(22) Filed: Oct. 5, 2004

(65) Prior Publication Data

US 2006/0075308 A1    Apr. 6, 2006

(51) Int. Cl.
*G06F 7/00* (2006.01)

(52) U.S. Cl. .................................................. 707/672

(58) Field of Classification Search .................. 707/10, 707/204, 3, 5, 6, 104.1
See application file for complete search history.

(56) References Cited

U.S. PATENT DOCUMENTS

| | | | | |
|---|---|---|---|---|
| 5,740,354 | A * | 4/1998 | Ben-Natan et al. | 714/45 |
| 6,144,967 | A * | 11/2000 | Nock | 707/103 R |
| 6,460,070 | B1 * | 10/2002 | Turek et al. | 709/202 |
| 6,564,171 | B1 * | 5/2003 | Peterson et al. | 702/182 |
| 6,769,079 | B1 * | 7/2004 | Currey et al. | 714/45 |
| 6,802,067 | B1 * | 10/2004 | Camp et al. | 719/315 |
| 6,826,591 | B2 * | 11/2004 | French et al. | 709/201 |
| 6,944,800 | B2 * | 9/2005 | Brundridge et al. | 714/48 |
| 7,035,925 | B1 * | 4/2006 | Nareddy et al. | 709/224 |
| 2002/0010804 | A1 * | 1/2002 | Sanghvi et al. | 709/318 |
| 2002/0019886 | A1 * | 2/2002 | Sanghvi et al. | 709/318 |
| 2004/0122937 | A1 * | 6/2004 | Huang et al. | 709/224 |
| 2004/0139368 | A1 | 7/2004 | Austen et al. | 714/20 |
| 2004/0220945 | A1 * | 11/2004 | Pioli et al. | 707/100 |
| 2004/0254919 | A1 * | 12/2004 | Giuseppini | 707/3 |
| 2005/0028171 | A1 * | 2/2005 | Kougiouris et al. | 719/318 |
| 2005/0149535 | A1 * | 7/2005 | Frey et al. | 707/100 |

OTHER PUBLICATIONS

Weck, W., Proceedings of the Workshops on Object -Oriented Technology, Lecture Notes in Computer Science; vol. 1357, 1997, pp. 384-388 (numbered as 1-8 for the instant Office Action).*
Jones, S. et al., "Transaction Logging", *Journal of Documentation*, 1997, 53(1), 35-50.
Kanaya, N. et al., "Distributed Workflow Management System for Electronic Commerce", *Proceddings Fourth Int Enterprise Distrib Objects Comput Con*, 2000, 150-159.
Norvag, K., "Object and Log Management in Temporal Log-Only Object Database Systems", *Advances in Databases and Information Systems*, 2001, 210-224.
Pesati, V.R. et al., "The Design and Implementation of a Multilevel Secure Log Manager", *Proceedings IEEE Symp on Security & Privacy*, 1997, 55-64.
Rohn, J.A., "The Usability Engineering Laboratories at Sun Microsystems", *Behavior & Information Technology*, 1994, 13(1,2), 25-35.

* cited by examiner

*Primary Examiner*—Cheyne D Ly
(74) *Attorney, Agent, or Firm*—Woodcock Washburn LLP (57) ABSTRACT

A system and method for managing log entries associated with execution events in an application. The system and method may include a log provider wrapper for receiving log entries associated with the event and log providers for receiving all or part of the information associated with a log entry. The log provider wrapper, through communication with a logging configuration, may filter the log entry, segment information contained in the log entry, format the information, and deliver the information to one or more log providers. The log providers may send the information to a respective destination medium.

20 Claims, 5 Drawing Sheets

405
Event added to application/event instantiated

410
Application calls event for initialization

410
Event initialized; potential log entries provided

415
Log entries populated in user interface (UI) medium

420
User opens potential log entries and log providers in a UI

425
User inspects potential log entries and log providers, and makes selections

430
UI updated based on selections

FIG. 4

LOG MANAGEMENT SYSTEM AND METHOD

FIELD OF THE INVENTION

The field of the invention generally relates to logging software events and particularly to a management system enabling a high degree of control over logging.

BACKGROUND OF THE INVENTION

During the execution or running of an application, a multitude of events may take place. For example, the application may execute multiple steps multiple times. The application may run loops in multiple iterations. It may make and close numerous connections. Threads may be initiated and completed. An event may trigger other events, which may trigger still other events. Prior to execution of such events, an execution plan may be developed showing how the execution of the events will be completed.

An application or an event in an application may generate log events or a historical record of events occurring during the running of an application. After the execution plan is developed but before it is executed, it also may be logged. For troubleshooting purposes, a user may benefit from reviewing the application's logged events. A user may further benefit from viewing information about any of the events that occurred during the execution of an application. Such information may aid in diagnosing problems or answering questions related to results of the execution of the application.

When an event is to be executed, a decision may be made to create a log or not to create a log. That is, a choice may be provided to either log or to not log an event. If the event is to be logged, then information regarding the execution of the event may be sent to a log. Aside from being able to turn logging on or off, little flexibility may be included in the logging technique.

Typically, a logging event may be flat in the sense that all of the log event information may be sent to a single destination. Upon execution of an event, the event information may be logged without any segmenting of the information to retain, for example, desired information and delete undesired information. Instead, all of the event information may be logged. A user then may filter all of the logged events for viewing. That is, the user may view the information in which the user is interested but may not be able to select the event information to be logged. Additionally, some logging may include a filtering of the information before delivery to a single destination. Other logging may include logging to multiple destinations but may not include filtering. Logging options may not include the ability to send a piece of information related to a log event to one destination, and another piece to another destination.

As noted, typically, the event log or logs later may be searched depending on information desired. However, because information is logged and then filtered for viewing purposes, the log may provide information regarding only critical or essential events. System constraints or memory limitations may limit the logging of both critical and less critical events. For example, logging may not record data relating to an execution plan. A choice of only to log or not to log may not enable a user to selectively log a particular kind of event. Additionally, a user may not be able to send part of a log event to one destination and another part of the event to a second destination, even though certain events may be of interest to specific users but not to other users. The typical logging options may not enable a logging event to be selectively delivered to a user who may be interested in the event and to not be delivered to another user who may uninterested in the event.

Therefore, there is a need to enable a user to exercise a fine degree of control over the large volume and different types of logging information regarding execution plans, event executions, and other occurrences within an application. There is a need for a system enabling a log event to be disseminated to multiple destinations and to enable segmenting the log event such that part of the information may be sent to one destination and another part to a second destination. There is a need to enable a user to control logging configurations, log filtering, scope of logging, destination designations, and log formats.

SUMMARY OF THE INVENTION

The invention includes a log management system and method providing the capability of selectively logging events and for multiplexing information contained in log entries to multiple destinations. The system may enable selectively producing, maintaining, and delivering information contained in a log entry. The system may provide for filtering of events to determine which potential log entries should be generated. The system may provide for segmenting the log entry so that part of the log entry may be delivered to one user and another part delivered to a second user. The system may provide for segmenting a logging configuration according to the various scopes (i.e. parts, or sections) of the environment in which logging takes place. The system may also provide for the delivering of the log entries to one or more destinations in one or more formats.

The method may include receiving potential log entries related to an event execution or occurrence. The log management system may determine whether there is an interest within or outside of an application that justifies generating one or more of the kinds of log entries. If the log management system determines that there is no interest, then the event may be executed without generating a log entry. If the log management system determines, according to a logging configuration, that there is interest in a log entry, then the log entry may be generated upon or after event execution. The entry may be segmented so that some of the information contained in the log entry may be sent to one destination and some other information may be sent to three destinations. The system and method may also allow for adding an event to an application and providing for selection of log event information associated with the added event.

Other features of the invention are described below.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Example Computing Environment

Figure 1:
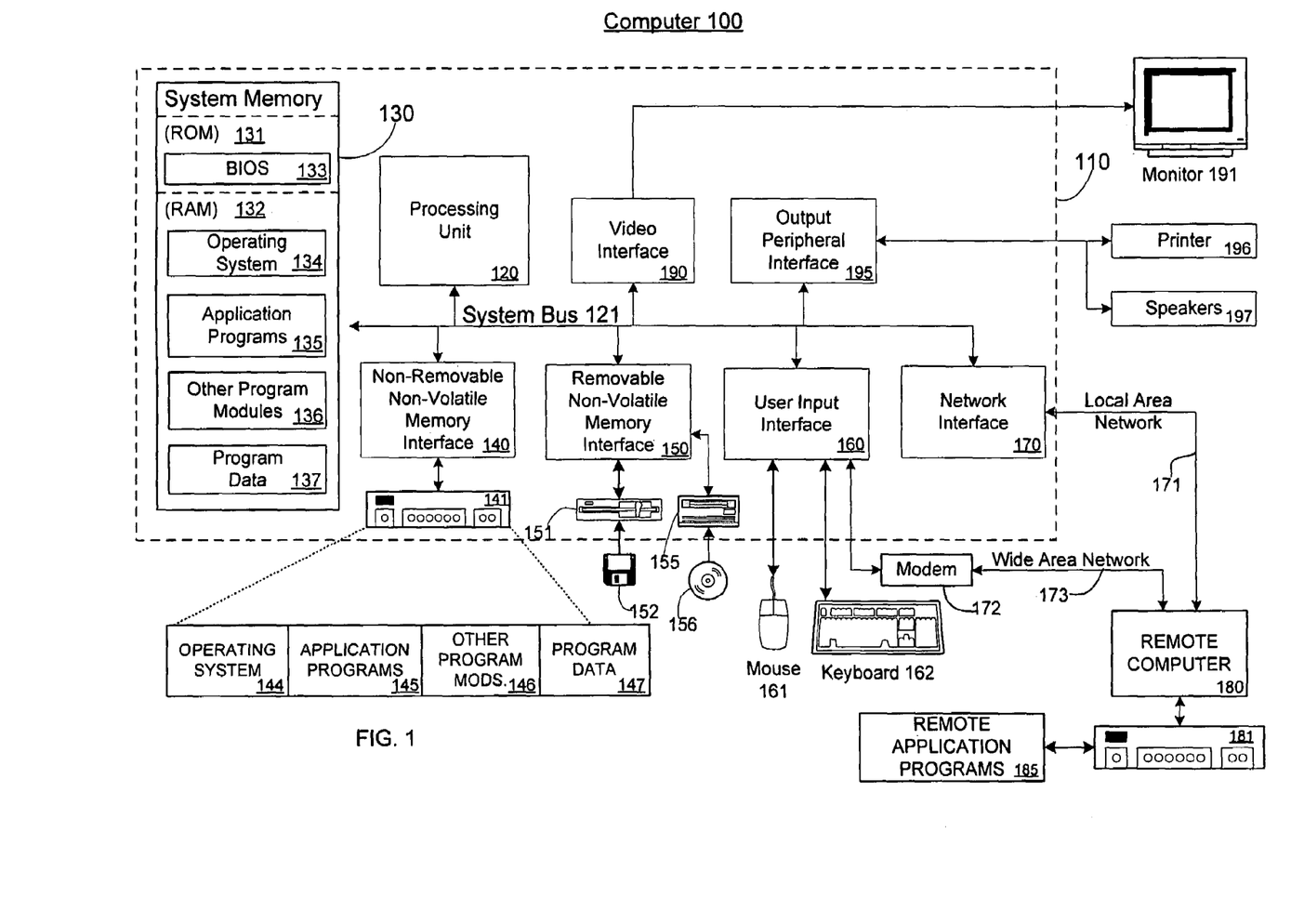
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Log Management System

Figure 2:
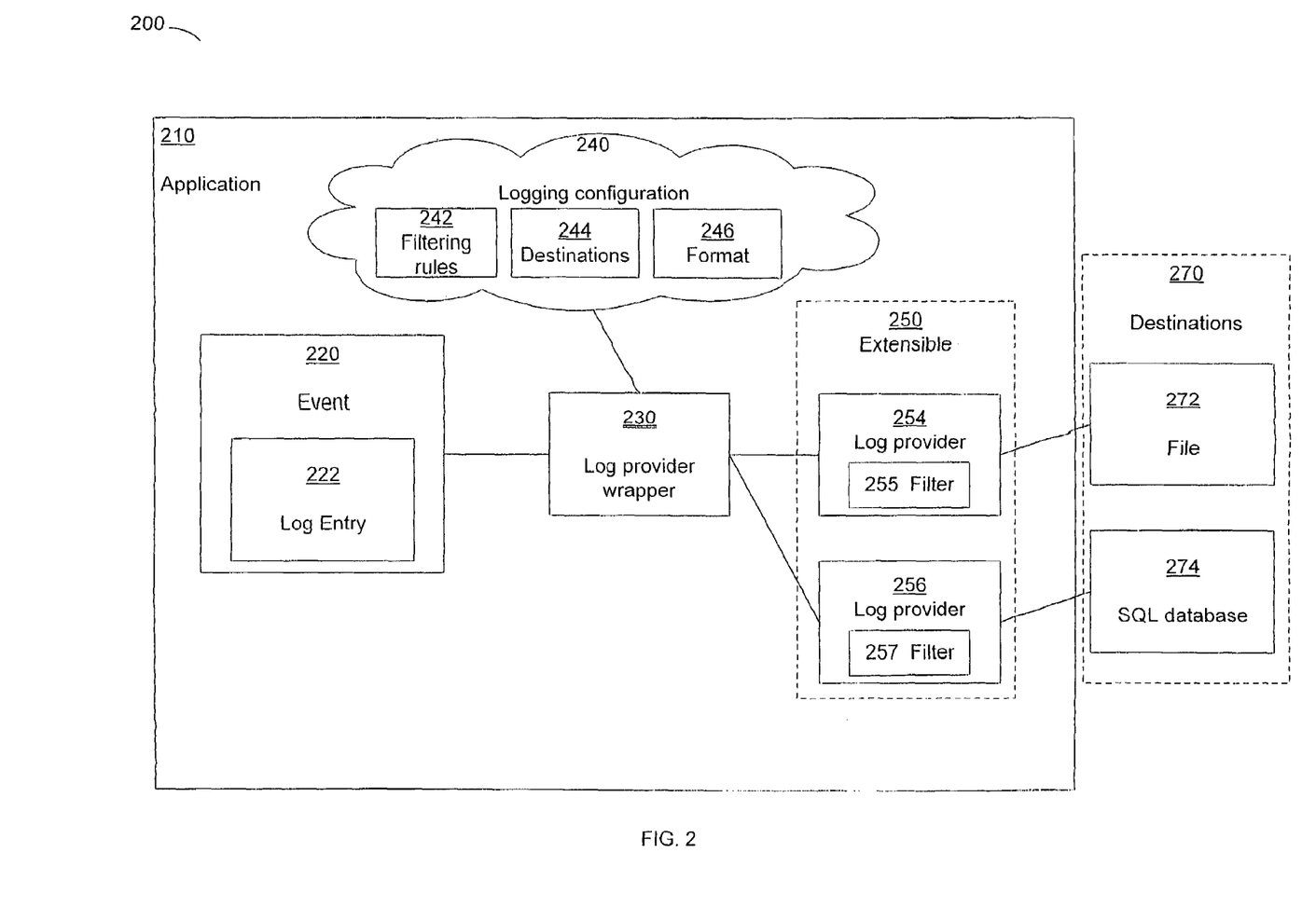
FIG. 2 is a block diagram showing an example embodiment of a log management system.

FIG. 2 depicts a block diagram of an example system 200 for a log management system. The system 200 includes an application 210, an event 220, a log provider wrapper 230, a logging configuration 240, log providers 254, 256, a file 272, and a database such as, for example, a structured query language (SQL) database 274.

The application 210 may be any type of software application written in any format. For example, the application 210 may be written in a programming language such as C, Pascal, etc. Also for example, the application 210 may be written in an object-oriented language. The application 210 contains the event 220. The application 210 may contain numerous events, and the event 220 is shown as representative of such numerous events. The event 220 may be any type of action occurring within an application. The event 220 may be the performance of a function or task, or any other event which may generate a log entry 222. The application 210 may have numerous events such as event 220.

The log entry 222 may be any type of log entry related to the running of the event 220 or the application 210. The log entry 222, for example, may be related to an execution plan for the event 220 or for the application 210. Also for example, the log entry may be a start time or an end time for an execution of the event 220. The log entry may indicate when the event 220 triggered the execution of another event. Of course, the event 220 and the application 210 may generate numerous log entries.

The event 220 communicates with the log provider wrapper 230. Upon a start or execution event, the event 220 may contact the log provider wrapper and indicate that the log entry 222 may be available upon or after execution of the event 220. The event 220 may then query the log provider wrapper 230 to determine if the log provider wrapper 230 is interested in the log entry 222. The application 210 may have any number of log provider wrappers. (By way of example and not limitation, a single log provider wrapper 230 is shown in FIG. 2).

The log provider wrapper 230 may be in communication with the logging configuration 240. If the application 210 is built on an object model, then the logging configuration 240 may be an object. Alternatively, the logging configuration 240 may be logic or code within the application 210. The log provider wrapper 230 may consult the logging configuration 240 associated with the application 210 to determine if there is interest in the potential log entry 222.

The logging configuration 240 may contain evaluation factors for determining whether a log entry 222 should be produced by the event 220 upon or after its execution. Such factors may include destinations 244 indicating which log providers 254, 256 may be interested in the log entry 222. Additionally the logging configuration 240 may consider any filtering rules 242 for each interested log provider 254, 256. The filtering rules 242 indicate which information contained in the log entry 222 can be delivered to which log providers 254, 256. In other words, the entire log entry 222 may be delivered to each selected destination or just a part of the log entry 222 may be delivered.

Finally, the logging configuration 240 may also provide parameters for a format 246 of the log entry 222 to be delivered to the log providers 254, 256. In an alternative embodiment, the destination 244 of the log entry 222 may dictate the format for the log entry without the necessity of a separate determination by the logging configuration 240. That is, if the destination is the SQL database 274, then the log entry 222 may be formatted accordingly.

The log provider wrapper 230 may consult with the logging configuration 240 to identify the filtering rules 242, the potential destinations 244, and the format 246 for the log entry 222. From this, the log provider wrapper 230 may determine if there is interest within the application 210 to have the log entry 222 produced by the event 220. The logging configuration 240 may indicate, for example, that the log entry 222 should be sent to three different destinations in two different formats. In this case, the log provider wrapper 230 may inform the event 220 to generate the log entry 222 during or after execution. If the log provider wrapper 230 determines, in consultation with the logging configuration 240, that the application 210 is not interested in the log entry 222, then the log provider wrapper indicates to the event 220 to not generate the log entry 222.

In an alternative embodiment, the logging configuration 240 may not inherently contain the information that defines the filtering rules 242, the destinations 244, and the format 246. Instead the logging configuration 240 may determine this information from the log providers 254, 256 contained in the application 210. That is, each log provider 254, 256 provides the logging configuration 240 with the information necessary for the logging configuration 240 to consult with the log provider wrapper 230. The logging configuration 240 may relay information directly from the log providers 254, 256 to the log provider wrapper 230. The log provider wrapper 230 then communicates accordingly with the event 220.

The log providers 254, 256 may be created by the log provider wrapper 230 based on the logging configuration 240. The log providers 254, 256 may be responsible for writing the log entry 222 in an applicable format and sending the log entry 222 to a particular destination. In an object-model application, the log providers 254, 256 may be objects. In a programming language application, the log providers 254, 256 may be logic or code in the form of a function or other form.

The log provider wrappers 254, 256 each may perform a filtering function separate from, and in addition to, filtering completed by the logging configuration 240. Each log provider 254, 256 may be configured to accept a log event and filter the log event, retaining only certain information related to the event. Therefore, in one embodiment of the invention, two filtering processes are used: one type for deciding if the log entry 222 is of interest to any log provider 254, 256, and another—completed by the individual log providers 254, 256—for deciding which part of the log entry may be retained within the log providers 254, 256. For example, a log entry may contain several columns of data such as a column indicating data time, another containing text, another containing data code, and still others containing other information. One log provider 254 may be interested in a log entry, and therefore the log provider wrapper 230 may deliver the log event to the log provider 254. The log provider 254 may then filter the data and only retain the column with text.

The log providers 254, 256 may be defined by the destination of the log. For example the log provider 254 may be a file log provider, and the log entry from the log provider 254 is delivered to a file 272. Another log provider 256 may be a SQL database log provider, and therefore log entries from the log provider 256 are delivered to the SQL database. Formats for the delivery of the log entry 222 may be defined as the implicit implementation of the log provider 254, 256. Of course, those skilled in the art will recognize that there may be other destinations 270 in addition to the file 272 and the SQL database 274. Therefore, there may be other log providers 254, 256.

As noted above, the application 210 may be written in any programming language. If the application is based on an object model, then a default position may be that, if a logging configuration 240 is not provided in an object, then a default mode requires the event 220 or the log provider wrapper 230 to look to a parent object to determine filtering rules, destination, format, etc. If a parent object does not contain a logging configuration 240, then the default may be to go to the parent of the parent. This process continues until a parent with a logging configuration 240 is located. Similarly, in an application 210 written in a programming language that lacks the object structure referred to above, higher level functions containing logic for a logging configuration 240 may be a default for lower level functions that do not contain a logging configuration 240. Therefore, in one embodiment, there is a default mechanism, which may reduce the amount of repetitive logging configurations 240 that are required within the log management system 200.

After the event 220 is executed and the log entry 222 is delivered to the log provider wrapper 230, the log provider wrapper 230 may enable multiplexing of the log entry 222. That is the log provider wrapper 230 delivers the log entry 222 or parts of the log entry 222 to numerous log providers 254, 256. The log provider wrapper 230 enables a single log entry 222 to be delivered to many places without requiring that two different log events be specified within the event 220. For example, instead of producing a SQL log to log an event to a SQL database and a flat file log to log the same event to a flat file, one example embodiment of the invention may allow creation of one log entry 222 to be sent to both the SQL server 274 and the file 272.

Additionally, the log management system 210, through the log provider wrapper 230 may segment log entry 222 data so that it can be logged in different ways. For example, the log management system 200 enables error and warning information to be sent to one destination 270 to be viewed by system operators. Data processing sampling logging information is sent to another destination 270 for users focused on completing data quality analysis. Package execution information, time started, time completed, etc, information is sent to a third destination for viewing by users interested in high level reporting.

All of this multiplexed logging may be completed without the source level being involved in the logging event delivery. The configuration of logging events may be completed at a higher level, such as at a parent object level, or at a main function level. This not only aids in reducing duplication of log events 222 but also diminishes confusion regarding where each log event 222 is destined.

The ability to selectively retain various parts of the information in a logging event in various places throughout an application 210 or system 200 enables the application 210 or the system 200 to provide a higher volume of information. Instead of maintaining a log of only critical information or critical errors because of system or memory limitations, the log management system 200 may enable more selective retention of information.

Additionally, the log management system 200 and the ability to multiplex information contained in a log event 222 to numerous destinations 270 may enable selective viewing of a log event based on the security rights of a user. For example, certain, low security information may be sent to a destination 270 for viewing by users with lower security rights, and different, more sensitive logging information contained in a logging event 222 may be sent to a destination 270 for viewing by users with higher security rights.

The log management system 200 also allows for extensibility. When an event 220 (such as a task or function) is added to the application 210, such event 220 may contain algorithms in the form of coding, objects, or some other form for a log entry 222. Such an event may be a pluggable component. The log management system 200 may allow for a related addition of a log provider. That is, the log provider 254, 256 may be extensible 250. The added event 220 may advertise its log entry 222 so that the logging configuration 240 knows what information may be logged. (Of course, the event 220 may have multiple log entries 222.) A user may then set the configurations for the potential logs from the pluggable component. A user may establish a filter, indicating which log providers 254, 256 should receive a log entry 222, specify format (if applicable), etc. Then, when the added event 220 is executed or otherwise occurs, and the pluggable component generates a log, the log provider wrapper 230 may consult with the logging configuration 240. Upon consultation, the log provider wrapper 230 knows what to do with the log events.

Figure 3A:
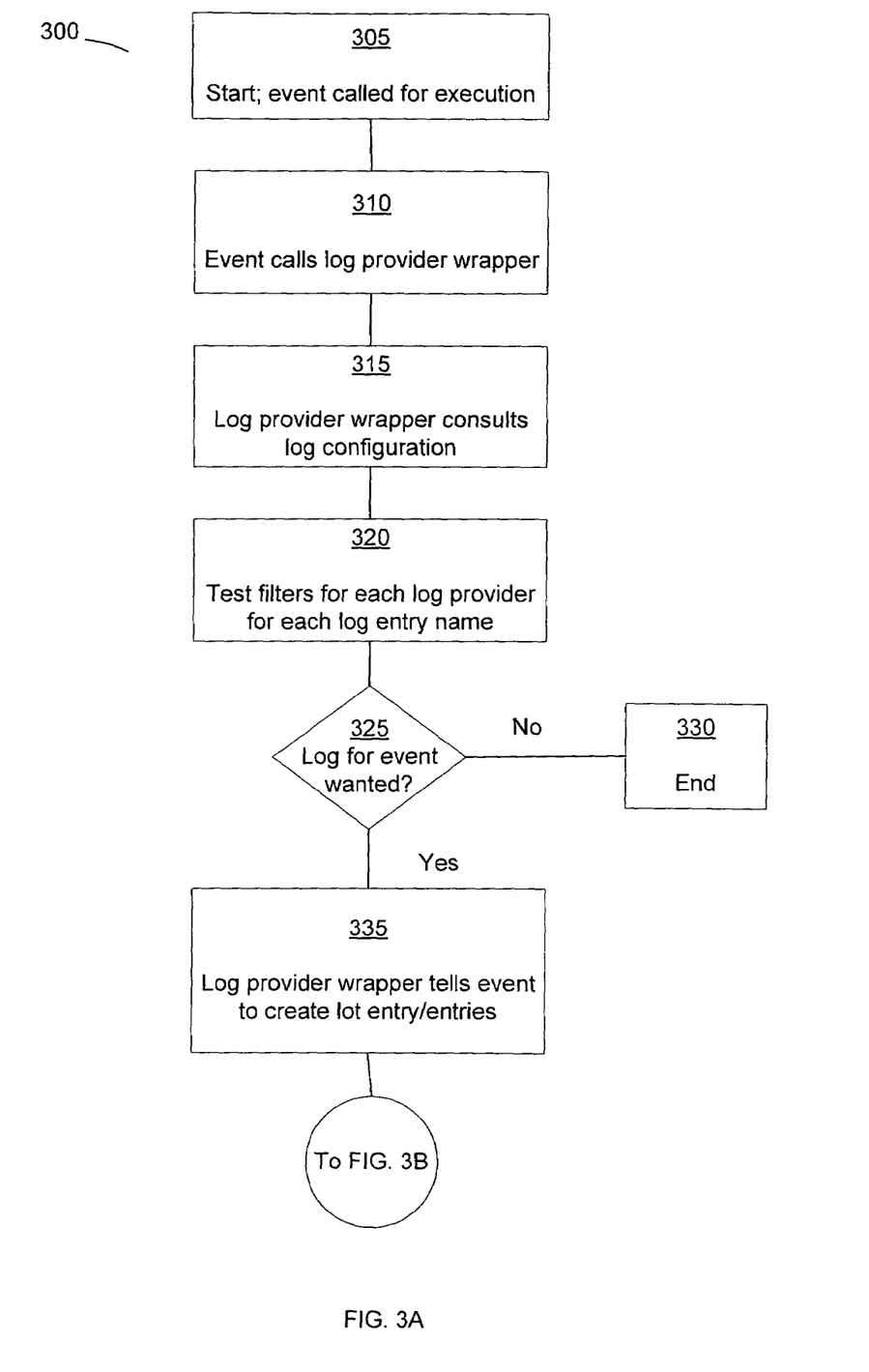
FIGS. 3A-3B are flow diagrams of an example method for log management.
Figure 3B:
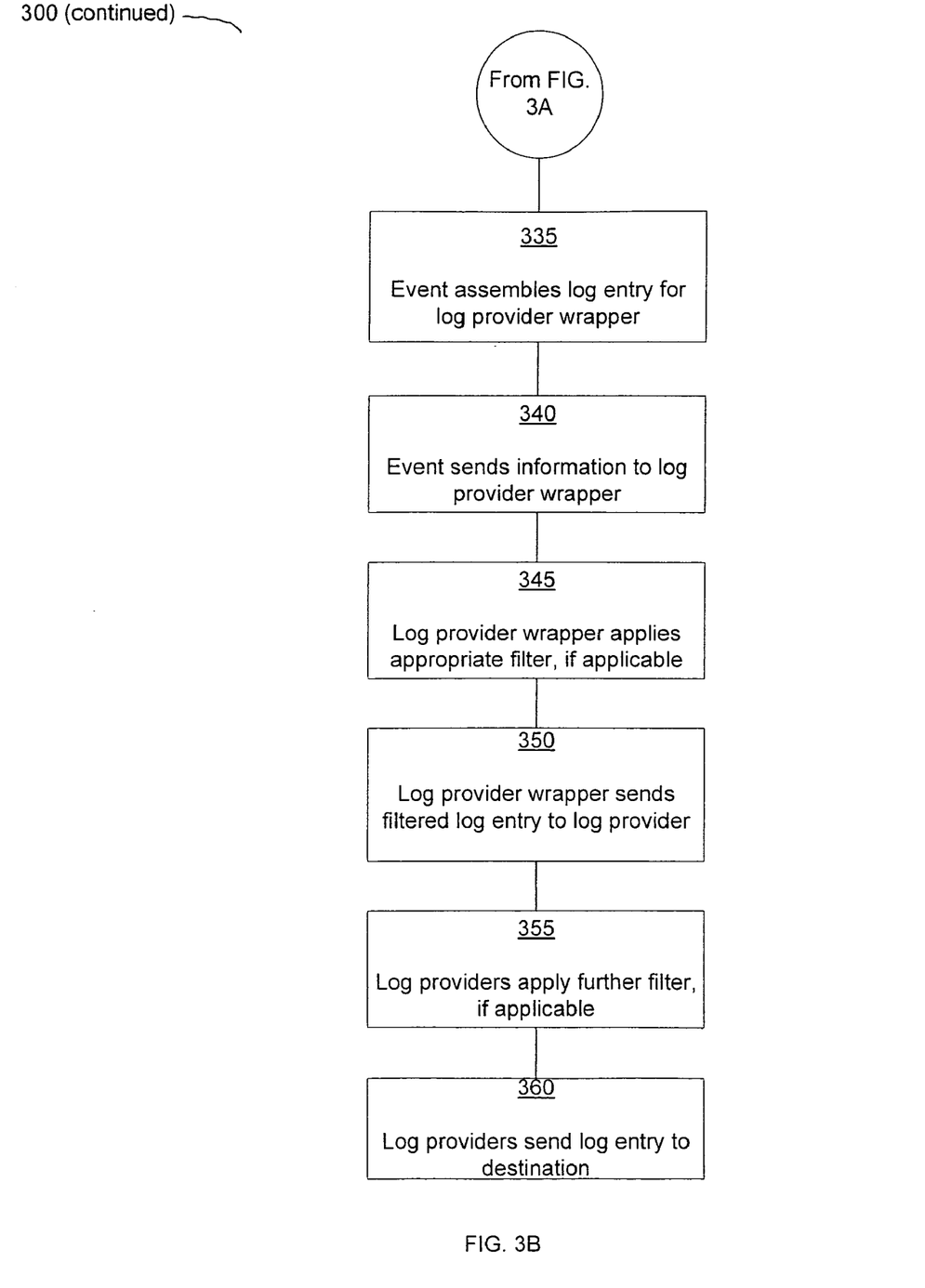

FIGS. 3A & 3B depict flow diagrams for performing a method of logging events in a log management system. The method may commence at step 305 with a start event such as a call to an event for execution. At step 310, the event may notify a log provider wrapper and provide the wrapper with available log entries. The log provider wrapper may consult the logging configuration at step 310 and decide whether the event should provide the log entries upon or after execution. At step 315, the log provider wrapper or the logging configuration may test the filters for each log provider within the application to make this decision. At step 325, the log provider wrapper may decide whether it desires any potential log entry that the event may provide. If the log provider wrapper determines that no log entry is desired, then the log provider wrapper may indicate that decision to the event at step 330 and no log will be provided. If the log provider wrapper concludes that the event should provide a log entry, then at step 335, the log provider wrapper may communicate the log entries that may be desired.

At step 335, the event may assemble information for one or more log entries. The event then may provide the log entries to the log provider wrapper at step 340. Additionally, the event may provide specific information pertinent to the applicable log entry. For example, if the event involves implementation of an execution plan or a part of an execution plan, then assembling information may involve traversing internal instructions that represent workflow to generate a textual representation of the execution plan. The log provider wrapper may, at step 345, apply appropriate filters to the log entries. This filtering enables the log provider wrapper to send, for example, start event time data to one log provider and error information to a separate log provider. Before assembling the information for a log entry, it is possible for the generator of the log entry to determine whether the log entry will pass the log provider wrapper's filter. If it is determined that it does not, then the expense of assembling the information comprising the log entry can be avoided and higher runtime performance can be achieved.

After applying appropriate filters, the log provider wrapper may consult with the logging configuration as described with regard to FIG. 2 and send the filtered log entries to appropriate log providers at step 350. The individual log providers may also apply further filtering to the log entry information at step 355 as described with regard to FIG. 2. At step 360, the log providers may send the log entry to a respective destination such as, for example, a file, a SQL database, etc.

It should be recognized that, in accordance with an alternative method for performing a method of logging events in a log management system, the method may commence at step 335. That is, an event may assemble one or more log entries and send them to the log provider wrapper without first querying the log provider wrapper to ascertain whether to generate the log entries. Additionally, it should be understood that the individual log providers may pass the information or log entry provided by the log provider wrapper to the appropriate destination without performing any filtering on the data.

Figure 4:
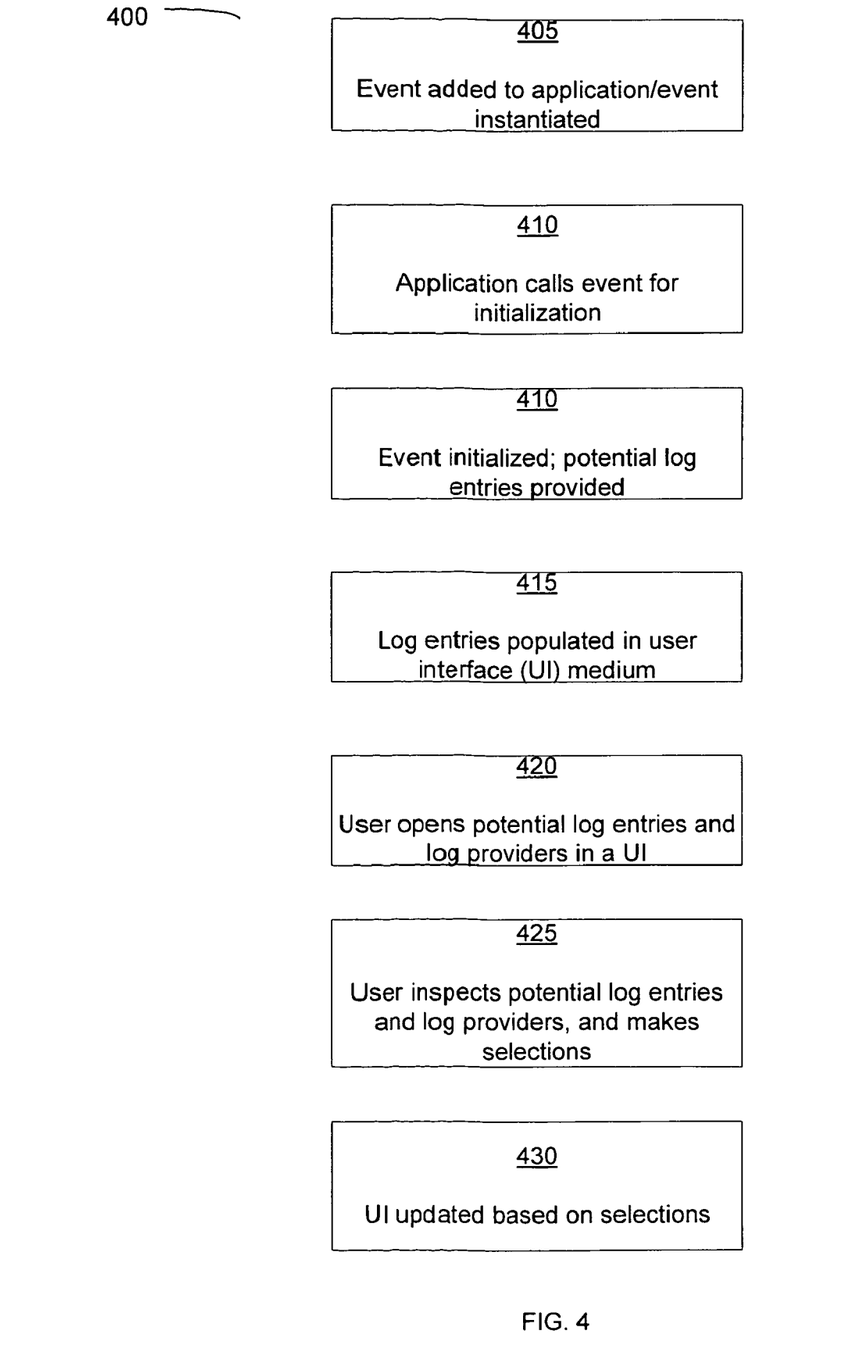
FIG. 4 is a flow diagram of an example method for adding an event and associated potential log entries to a log management system.

FIG. 4 depicts an example method for adding an event to an application and providing for selection of log event information associated with the added event. At step 405, an event may be added to or instantiated by an application. When the event is loaded, it receives an initialization call from the application at step 410. An initialization of the event maybe completed at step 410. During the initialization, the event may describe potential log entries available for production upon event execution. This indicates to the system what types of log entries may be available.

At step 415, a medium such as a data structure or table may be populated with the potential log entries for viewing in a user interface. A user, at step 420, may open the medium that contains the potential log entries to view the entries. The user may view the potential log entries immediately after the events are loaded or instantiated. Alternatively, the user may view the entries at a later time. Also at step 420, the user may inspect the installed log providers.

At step 425, the user may inspect the potential log entries at the user interface and select the desired entries. Additionally, the user may enumerate the log providers based on the destination desired for each potential log entry. Based on the user's selection, at step 430, the log management system or, more specifically, the log provider wrapper and/or the logging configuration may be updated.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other embodiments may be used or modifications and additions may be made to the described embodiments for performing the same function of the present invention without deviating therefrom. In no way is the present invention limited to the examples provided herein. Therefore, the present invention should not be limited to any single embodiment, but rather should be construed in breadth and scope in accordance with the appended claims.

What is claimed:

1. A system comprising a processor for managing event logging, comprising:
    a log provider wrapper for determining whether log entry data associated with an event should be generated and, if the log entry data should be generated, for receiving the log entry data;
    a plurality of log providers for writing log entries to one or more destinations, wherein the log provider wrapper filters information contained in the log entry data, segments the information contained in the log entry data such that a first segment contains a first part of the information and a second segment contains a second part of the information, selects one or more of said log providers, and sends the segmented information contained in the log entry data to one or more selected log providers, wherein the log provider wrapper and plurality of log providers permit contingent generation of log entry data and permit different log entries to be written to a plurality of destinations based on the generated log entry data; and
    a logging configuration in communication with the log provider wrapper, comprising at least one of a filtering rule, a destination for a log entry, or a format for a log entry, wherein the log provider wrapper selects the log providers based on the logging configuration.

2. The system of claim 1, wherein the system for managing event logging is based on an object model.

3. The system of claim 2, wherein the event is an event object, and the logging configuration is a parent object of the event object.

4. The system of claim 1, wherein a log provider filters the information contained in the log entry data.

5. The system of claim 4, wherein the log provider filtering the information results in logging a portion of the information.

6. The system of claim 1, wherein the log providers format the information contained in the log entry data for compatibility with a destination to which the information will be sent.

7. The system of claim 1, wherein a log provider sends segmented information as a log entry to a destination.

8. The system of claim 1, wherein the log provider wrapper sends the first segment of the information to a first log provider and the second segment of the information to a second log provider.

9. The system of claim 1, wherein an added log provider is added to the plurality of log providers of the system for managing event logging.

10. The system of claim 9, wherein the log provider wrapper filters the information contained in the log entry data, selects the added log provider, and sends the information contained in the log entry data to the added log provider.

11. A processor-implemented method for managing event logging in an application, comprising:
    determining, via the processor, whether log entry data comprising information related to an event should be generated, thereby permitting contingent generation of log entry data;
    if the log entry data should be generated, receiving the log entry data; and
    determining, via the processor, in accordance with a logging configuration comprising at least one of a filtering rule, a destination for a log entry, or a format for a log entry, what part of the log entry data should be recorded by:
        segmenting the information contained in the log entry data into a plurality of segments, wherein each segment comprises a respective portion of the information contained in the log entry data;
        filtering the information contained in the log entry data by determining if one or more log providers in a system are interested in any of the plurality of segments of the information contained in the log entry data; and
        sending a segment of the information contained in the log entry data to a log provider interested in the segment, thereby permitting different log entry data to be sent to a plurality of log providers based on the generated log entry data.

12. The method of claim 11, further comprising:
sending the segment of the information contained in the log entry data to a destination.

13. The method of claim 12, further comprising:
filtering the segment of the information contained in the log entry data prior to sending the segmented information to the destination, wherein the filtering is completed by the log provider.

14. The method of claim 11, further comprising:
notifying a log provider wrapper of a potential log entry;
determining interest in the log entry data; and
communicating the interest in the log entry data to the event.

15. The method of claim 11, further comprising:
formatting the information in the log entry data so that it is compatible with at least one of the log provider and the destination.

16. The method of claim 11, further comprising:
initializing the event;
displaying a potential log entry to a user; and
receiving a selection of the log entry.

17. A computer-readable storage medium having computer-executable instructions for performing steps, comprising:
    determining whether log entry data comprising information related to an event should be generated, thereby permitting contingent generation of log entry data;
    if the log entry data should be generated, receiving the log entry data determining, in accordance with a logging configuration comprising at least one of a filtering rule, a destination for a log entry, or a format for a log entry, what part of the log entry data should be recorded by:
        segmenting the information contained in the log entry data into a plurality of segments, wherein each segment comprises a respective portion of the information contained in the log entry data;
        filtering the information contained in the log entry data by determining if one or more log providers in a system are interested in any of the plurality of segments of the information contained in the log entry data; and sending a segment of the information contained in the log entry data to a log provider interested in the segment, thereby permitting different log entry data to be sent to a plurality of log providers based on the same log entry data.

18. The computer-readable storage medium of claim 17, having further computer-executable instructions for performing the steps of:

notifying a log provider wrapper of a potential log entry;

determining interest in the log entry data; and communicating the interest in the log entry data to the event.

19. The computer-readable storage medium of claim 17, having further computer-executable instructions for performing the steps of:

displaying a potential log entry to a user;

receiving a selection of the log entry; and adding a log provider based on the selection.

20. A processor-implemented method for managing event logging in an application, comprising:

notifying a log provider wrapper of a potential log entry;

determining, via the processor, interest in the potential log entry;

if there is interest in the potential log entry, receiving the potential log entry comprising information related to an event, comprising at least one of a filtering rule, a destination for a log entry, or a format for a log entry, thereby permitting contingent receipt of potential log entry information;

segmenting the information contained in the potential log entry into a plurality of segments, the plurality of segments including a first segment and a second segment, wherein the first segment includes a first portion of the information and the second segment includes a second portion of the information;

filtering the information contained in the potential log entry by determining if one or more of a plurality of log providers in a system are interested in any of the plurality of segments of the information contained in the log entry;

formatting the potential log entry information so that it is compatible with at least one of the log provider and the destination; and sending the first segment to a log provider interested in the first segment and the second segment to a log provider interested in the second segment, thereby permitting different potential log entry information to be sent to the plurality of log providers based on the information related to the event.

* * * * *